US011277965B2

(12) United States Patent
Otto et al.

(10) Patent No.: US 11,277,965 B2
(45) Date of Patent: Mar. 22, 2022

(54) KNIFE BLADE FOR A CUTTING KNIFE OF AN AGRICULTURAL HARVESTING MACHINE (71) Applicant: SMF—HOLDING GMBH, Eichelhardt (DE)

(72) Inventors: Sascha Otto, Racksen (DE); Ralf Schmidt, Mörsbach (DE)

(73) Assignee: SMF—HOLDING GMBH, Eichelhardt (DE)

(*) Notice: Subject to any disclaimer, the term of this patent is extended or adjusted under 35 U.S.C. 154(b) by 43 days.

(21) Appl. No.: 16/637,973

(22) PCT Filed: Aug. 9, 2018

(86) PCT No.: PCT/EP2018/071674
§ 371 (c)(1),
(2) Date: Feb. 10, 2020

(87) PCT Pub. No.: WO2019/030341
PCT Pub. Date: Feb. 14, 2019

(65) Prior Publication Data
US 2020/0187412 A1 Jun. 18, 2020

(30) Foreign Application Priority Data
Aug. 11, 2017 (EP) .................................. 17185901

(51) Int. Cl.
A01D 34/14 (2006.01)
(52) U.S. Cl.
CPC .................. A01D 34/14 (2013.01)

(58) Field of Classification Search
CPC .............................. A01D 34/14; A01D 34/135
See application file for complete search history.

(56) References Cited

U.S. PATENT DOCUMENTS

| 4,223,514 | A | 9/1980 | Halls et al. |
| 5,209,054 | A * | 5/1993 | Lawson ................. A01D 34/13 30/309 |
| 6,857,255 | B1 | 2/2005 | Wilkey et al. |
| 10,765,060 | B2 * | 9/2020 | Schuler .................. A01D 34/14 |

(Continued)

FOREIGN PATENT DOCUMENTS

| CN | 2317614 Y | 5/1999 |
| ER | 0 054 006 A1 | 6/1982 |

OTHER PUBLICATIONS

Communication dated Mar. 26, 2021, from the Canadian Intellectual Property Office in Application No. 3,071,062.

(Continued)

Primary Examiner — Abigail A Risic
(74) Attorney, Agent, or Firm — Sughrue Mion, PLLC (57) ABSTRACT A knife blade for a cutting knife of an agricultural harvesting machine, with a blade top side and a blade bottom side, wherein a surface of the blade bottom side is composed of a planar surface arranged in a plane and a recess region extending above the plane. A height of the knife blade corresponds to a maximum distance between the blade top side and the planar surface in a direction normal to the plane, a material thickness of the knife blade corresponding to a distance between the blade top side and the blade bottom side, and a method of manufacturing a knife blade.

29 Claims, 3 Drawing Sheets (56) References Cited

U.S. PATENT DOCUMENTS

| | | | |
|---|---|---|---|
| 2008/0000210 A1 | 1/2008 | Jolly | |
| 2008/0173001 A1* | 7/2008 | Herlyn | A01D 34/14 56/296 |
| 2010/0050587 A1* | 3/2010 | Stoffel | A01D 34/14 56/300 |
| 2011/0162241 A1* | 7/2011 | Wangsness | E01H 5/066 37/266 |
| 2019/0364726 A1* | 12/2019 | Schuler | A01D 34/04 |
| 2020/0214197 A1* | 7/2020 | Schaffer | A01D 34/14 |
| 2020/0329635 A1* | 10/2020 | Smith | A01D 34/03 |

OTHER PUBLICATIONS

International Search Report for PCT/EP2018/071674 dated Oct. 9, 2018 [PCT/ISA/210].

* cited by examiner

KNIFE BLADE FOR A CUTTING KNIFE OF AN AGRICULTURAL HARVESTING MACHINE

CROSS REFERENCE TO RELATED APPLICATIONS

This application is a National Stage of International Application No. PCT/EP2018/071674 filed Aug. 9, 2018, claiming priority based on European Patent Application No. 17185901.0 filed Aug. 11, 2017.

BACKGROUND OF THE INVENTION

Field of the Invention

The invention relates to a knife blade for a cutting knife of an agricultural harvesting machine, with a blade top side and a blade bottom side, wherein a surface of the blade bottom side is composed of a planar surface arranged in a plane and a recessed region extending above the plane. A height of the knife blade corresponds to a maximum distance between the blade top side and the planar surface in a direction normal to the plane, wherein a material thickness of the knife blade corresponds to a distance between the blade top side and the blade bottom side, and to a method of manufacturing a knife blade.

Background

A knife blade, for example, is known from the DE 32 08 270 C2. The disclosed knife blade is triangular in shape and has two cutting edge areas which are arranged at an acute angle to each other. The two cutting edge areas each comprise unilaterally ground cutting edges, which have indentations so that cutting teeth and interstices between the teeth are formed. The cutting teeth are pointed, forming a tooth tip.

A further knife blade is known from the U.S. Pat. No. 4,223,514 A. The disclosed knife blade has a closed wave form with concave and convex areas.

Knife blades of this type are usually used in mowing units of agricultural harvesting machines. A plurality of knife blades are screwed or riveted to a knife rail in a side-by-side arrangement, with the knife tips, which are formed by the tapered cutting edge areas, pointing in the working direction. The knives formed in this way are guided back and forth on a cutter bar transverse to the working direction. The cutting edges of the knife blades interact with guard fingers attached to the cutter bar, whereby the guard fingers form counter-cutting edges in the form of a blade gap. Here the cutting edge areas of the knife blades are aligned at an angle to the working direction and the counter-cutting edges of the guard fingers are approximately parallel to the working direction so that the crop can enter into the cutting area between the knife blades and the guard fingers and is cut off by the back and forth movement of the cutting knife. An alternative possibility is the use as a double knife with two counter-moving cutting knifes, or one fixed and one moving cutting knife without a guard finger. The thickness of the knife blade is adapted to the clear width of the blade gap in such a way that there is a certain distance between the knife blade and the respective counter-cutting edge, since the clear width of the blade gap is subject to a tolerance and the knife blade is bent during operation by forces impinged by the crop. On the other hand, the distance between the knife blade and the respective counter-cutting edge should not be too large, as crop may then be drawn into the blade gap and is not cut. The amount of material necessary to produce knife blades of appropriate thickness is comparatively high. Accordingly, considerable masses of the knife blades have to be moved back and forth by the cutting knife drive.

An objective of the present invention is to provide a mass-reduced knife blade, while still ensuring the necessary stability.

SUMMARY OF THE INVENTION

The objective is accomplished by the subject-matters of the independent claims. In the dependent claims, advantageous embodiments and preferred enhancements are disclosed.

The knife blade for a cutting knife of an agricultural harvesting machine according to the invention has a blade top side and a blade bottom side, wherein a surface of the blade bottom side is composed of a planar surface arranged in a plane and a recess region extending above the plane. A height of the knife blade corresponds to a maximum distance between the blade top side and the planar surface in a direction normal to the plane, and a material thickness of the knife blade corresponds to a distance between the blade top side and the blade bottom side. According to the invention, the material thickness is in at least a part of the knife blade less than the height of the knife blade.

An area in which the material thickness is less than the height, preferably covers at least half of the surface of the blade bottom side, more preferably 90 percent of the surface of the blade bottom side. In particular, it is preferable that the material thickness is less than the height in any area of the knife blade.

Preferably a cutting edge is formed on at least one edge region of the knife blade, the surface of the blade bottom side having at least in the edge region a partial surface of the planar surface. In accordance with a preferred embodiment, at least one wear mark is arranged on the surface of the blade bottom side outside the partial surface to determine wear at the cutting edge, the wear mark marking a height in the normal direction between the planar surface and the recess region. The wear mark indicates when the wear of the cutting edge has become so great that it is no longer located in the planar surface, but between the planar surface and the recess region. The wear mark is preferably located between the planar surface and the recess region and can, for example, be made in the form of an indentation. Alternatively, the wear mark can also be formed by the recess region itself, i.e. the wear can be detected by the fact that the cutting edge is located within the recess region.

A further partial surface of the planar surface of the blade bottom side is preferably arranged around the opening. At a rear edge of the knife blade, a number of further partial surfaces of the planar surface are preferably arranged on the surface of the blade bottom side. The partial surfaces at the rear edge are separated from each other, in particular by the recess region.

Preferably at least one mounting recess is provided, whereby on the surface of the blade bottom side a further partial surface of the planar surface is arranged around the mounting recess. The blade top side preferably has an embossment surrounding the mounting recess, whereby the embossment is shaped to match a fastener.

The knife blade according to the invention is preferably a so-called triangular blade, which is used, for example, with mowers of combine harvesters. Furthermore preferred, the knife blade according to the invention is alternatively designed as a rotary mower blade or as a chopper blade, which have a rectangular basic shape.

All subsequently described features with reference to further aspects of the invention or inventive embodiments accomplishing the objective may be combined at will with the previously described inventive and preferred features.

An embodiment of the knife blade in accordance with the invention for a cutting knife of an agricultural harvesting machine, having a blade top side and a blade bottom side, wherein a surface of the blade bottom side is composed of a planar surface arranged in a plane and a recessed region extending above the plane, a height of the knife blade corresponding to a maximum distance between the blade top side and the planar surface in a direction normal to the plane, wherein a material thickness of the knife blade corresponds to a distance between the blade top side and the blade bottom side, wherein the material thickness is in at least a part of the knife blade less than the height of the knife blade, which accomplishes the objective, is characterized in that the knife blade has at least one opening, wherein a partial surface of the planar surface of the surface of the blade bottom side is arranged around the at least one opening.

One or more openings in the knife blade are advantageous for a weight reduction. In order to avoid disadvantages with regard to the stability in an area of the opening, a partial surface of the planar surface surrounding the opening is advantageous. These partial surfaces around the opening or the openings of the knife blade, together with the other partial surfaces, form the planar surface on the blade bottom side. Apart from the position of these partial surfaces around the opening or the openings of the knife blade, they do not differ from other partial surfaces of the planar surface on the blade bottom side. To distinguish the partial surfaces, the partial surfaces of the planar surface around the opening or openings of the knife blade are also called opening partial surfaces of the planar surface on the surface of the blade bottom side.

Preferably the opening is designed as a central opening. Alternatively, a knife blade with two or more openings is preferred, with the partial surface of the planar surface of the surface of the blade bottom side being arranged around the openings.

A further embodiment of the knife blade according to the invention for a cutting knife of an agricultural harvesting machine, with a blade top side and a blade bottom side, wherein a surface of the blade bottom side is composed of a planar surface arranged in a plane and a recess region extending above the plane, wherein a height of the knife blade corresponds to a maximum distance between the blade top side and the planar surface in a direction normal to the plane, wherein a material thickness of the knife blade corresponds to a distance between the blade top side and the blade bottom side, wherein the material thickness is in at least a part of the knife blade less than the height of the knife blade, which accomplishes the objective, is characterized in that a surface of the blade top side is composed of an upper planar surface arranged in an upper plane and an top side region extending outside the upper plane.

The upper planar surface has the advantage that the knife blade, despite the weight reduction, can basically also be used with the blade top side down. To mount the knife blade to a cutter bar, a corresponding planar surface is required. This planar surface abuts against a corresponding planar surface of the cutter bar in a mounted state. There is a defined distance between the planar surface, which is also referred to as the lower planar surface in the sense of the invention, and the upper planar surface, whereby the material thickness in order to reduce the weight of the knife blade is, according to the invention, less than this distance.

At a rear edge of the knife blade, a plurality of partial surfaces of the planar surface are preferably arranged on the surface of the blade bottom side. These partial surfaces at the rear edge of the knife blade together with the other partial surfaces form the planar surface on the blade bottom side. Apart from the position of these partial surfaces at the rear edge, they do not differ from other partial surfaces of the planar surface at the blade bottom side. To differentiate between the partial surfaces, the partial surfaces of the planar surface at the rear edge of the knife blade are also referred to as rear partial surfaces of the planar surface at the surface of the blade bottom side. The partial surfaces at the rear edge are separated from each other, in particular by the recess region.

Still preferred, a plurality of upper partial surfaces of the upper planar surface are arranged at the rear edge of the knife blade on the surface of the blade top side. The upper partial surfaces together form an upper planar surface on the surface of the blade top side and differ in this respect from the partial surfaces on the blade bottom side.

Particularly preferred, the upper partial surfaces on the blade top side are arranged opposite the recess region on the blade bottom side, at least in the area of the rear edge of the knife blade. Thus furthermore particularly preferred, upper partial surfaces are arranged along the rear edge, alternating with partial surfaces, i.e. the rear partial surfaces, at the blade bottom side.

This results in the rear edge of the knife blade having a kind of wave form, with flattened wave crests and wave troughs in the shape of the upper partial surfaces on the blade top side and the rear partial surfaces on the blade bottom side. This particularly advantageously allows the knife blade to be mounted with the blade top side facing down, as well as with the blade bottom side facing down.

The terms top and bottom, as well as blade top side and blade bottom side refer to a general mounting position of the knife blade on a harvesting machine, and do not have a restrictive effect in this respect, but are intended to distinguish conceptually both sides of the knife blade. In particular, the knife blade according to the invention may also be mounted with the blade top side pointing downwards with respect to the harvesting machine. It is particularly advantageous to mount the knife blades alternately along the cutter bar, once with the blade bottom side facing down and once with the blade top side facing down.

Preferably, a cutting edge is formed on at least one edge region of the knife blade, the surface of the blade bottom side having at least in the edge region a partial surface or a plurality of separate partial surfaces of the planar surface. These partial surfaces in the edge area of the knife blade together with the other partial surfaces form the planar surface on the blade bottom side. Apart from the position of these partial surfaces in the edge area, they do not differ from other partial surfaces of the planar surface on the blade bottom side. To differentiate between the partial surfaces, the partial surfaces in the edge area of the knife blade are also referred to as edge partial surfaces of the planar surface on the surface of the blade bottom side.

Preferably, one or more mounting recesses are provided, wherein further partial surfaces of the planar surface are arranged surrounding the mounting recesses on the surface of the blade bottom side. These partial surfaces around the mounting recesses of the knife blade together with the other partial surfaces form the planar surface on the blade bottom side. Apart from the position of these partial surfaces around the mounting recesses, they do not differ from other partial surfaces of the planar surface on the blade bottom side. To differentiate between the partial surfaces, the partial surfaces around the mounting recesses of the knife blade are also referred to as mounting partial surfaces of the planar surface on the surface of the blade bottom side.

A further aspect of the invention relates to a method of manufacturing the described knife blade according to the invention, wherein at least one shaping step is provided in which the knife blade is shaped in such a way that the material thickness is in at least a part of the knife blade less than the height of the knife blade. Preferably, the shaping step is carried out by means of a primary forming or a secondary forming process. Furthermore preferred, at least one further processing step is provided, during which the planar surface on the surface of the blade bottom side is processed by means of at least one machining process.

BRIEF DESCRIPTION OF THE DRAWINGS

The invention will be explained in more detail below with respect to an exemplary preferred embodiment with reference to the enclosed drawings. The illustrations concern the knife blade according to the invention as well as the method of manufacturing the knife blade according to the invention. The statements are only exemplary and do not limit the general concept of the invention.

In the Figures

DETAILED DESCRIPTION OF THE INVENTION

Figures 1, 2, 3, 4:
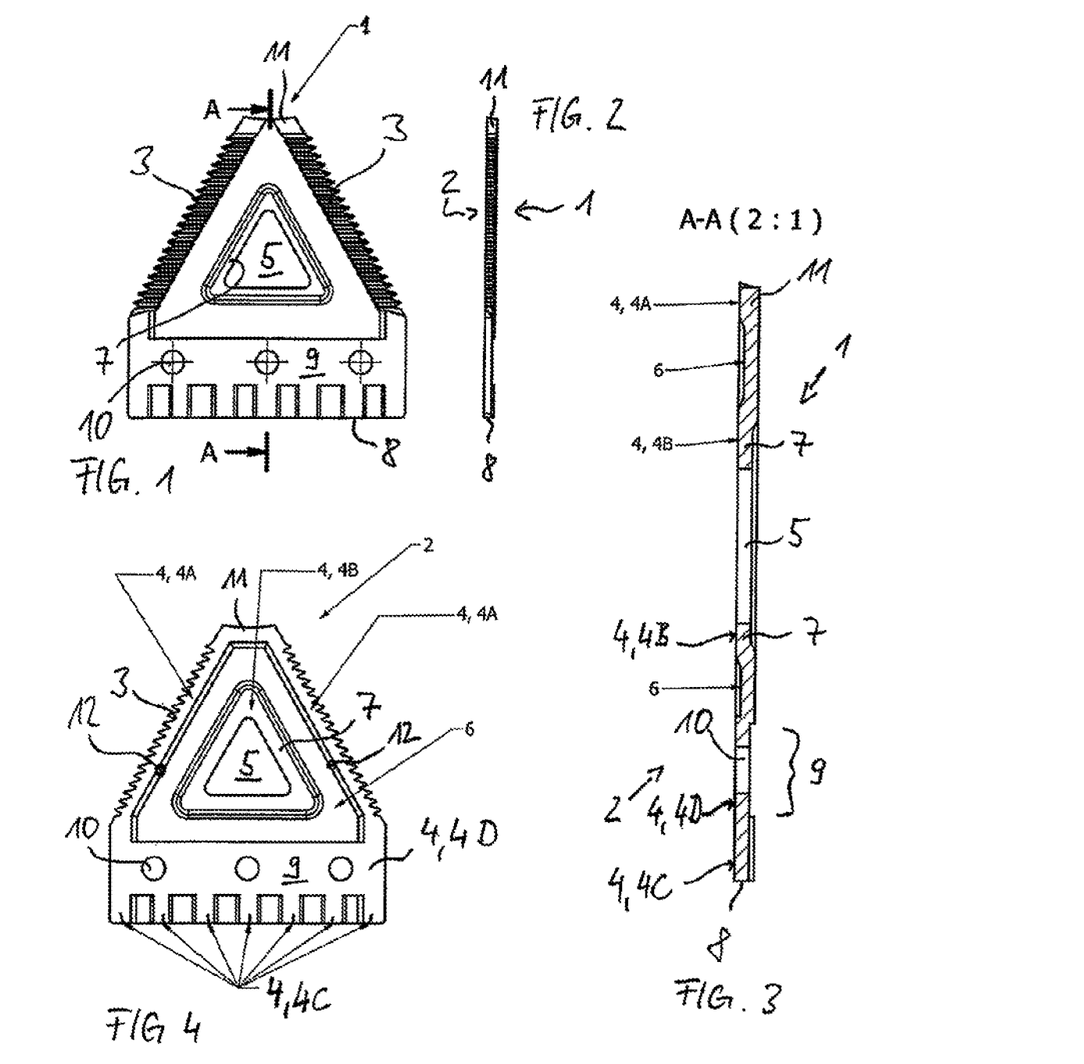
FIGS. 1 to 5 show a first embodiment of a knife blade according to the invention in different views.

In FIG. 1, the knife blade according to the invention is shown according to a first embodiment in a plan view of a blade top side 1. The knife blade has two cutting edge areas 3, where the edge of the knife blade is provided with a cutting edge for cutting crop. In a front area of the knife blade, hereinafter referred to as knife tip 11, regardless of whether it is actually pointed or rather blunt as in the exemplary embodiment, the cutting edge areas 3 converge approximately to form the roughly triangular shape of the front part of the knife blade. This part of the knife blade further comprises an approximately triangular opening 5 with a surrounding peripheral area 7. The knife blade shown is also called a triangular blade. However, a rotary mower blade or a chopper blade may also be designed according to the invention, which have a rather rectangular basic shape. When seen in a driving and working direction of an agricultural harvesting machine with a cutting knife, which includes the knife blade shown, the knife tip 11 is oriented towards the front end and a rear edge 8 of the knife blade towards the rear end. Where the terms front and rear are used herein, they refer to the working direction of the harvesting machine. The direction of movement of the cutting knife with the knife blade for cutting the crop relative to the harvesting machine is transverse to the working direction, in particular approximately orthogonal to it, in a horizontal or slightly angled mounting position, which corresponds to the drawing plane in FIG. 1. Adjacently to front part of the knife blade, which is approximately triangular in the depicted view, is arranged a mounting part 9, which is approximately rectangular in the depicted view, and comprises the rear edge 8 at its terminal end. The mounting part comprises mounting means 10 for fastening the knife blade, which is usually attached to a cutter bar (not shown) to form the cutting knife with a plurality of other knife blades. In the exemplary embodiment, boreholes 10 are provided as mounting means, which can be used, for example, to make screw connections.

FIG. 2 shows the knife blade of FIG. 1 in a 90 degree rotated view from the side, in which the position of the knife tip 11 at the front and the rear edge 8 at the back, as well as the overall flat shape of the knife blade with the blade top side 1 and a blade bottom side 2 are visible.

In FIG. 3, a section view along the line A-A in FIG. 1 is depicted in double magnification. FIG. 4 shows a view of the blade bottom side 2 of the knife blade, whereas FIG. 5 shows an enlarged view of the rear edge 8 rotated by 90 degrees compared to FIG. 1.

Figure 5:
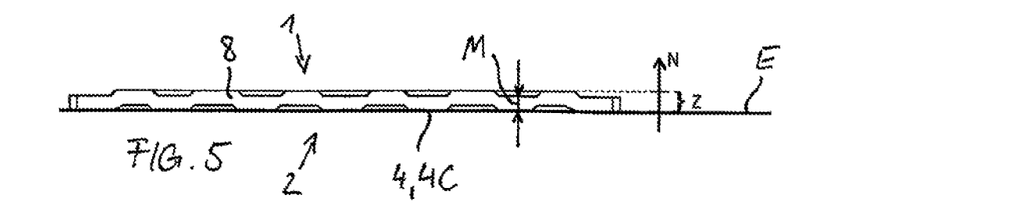
Figures 6, 7, 8, 9, 10:
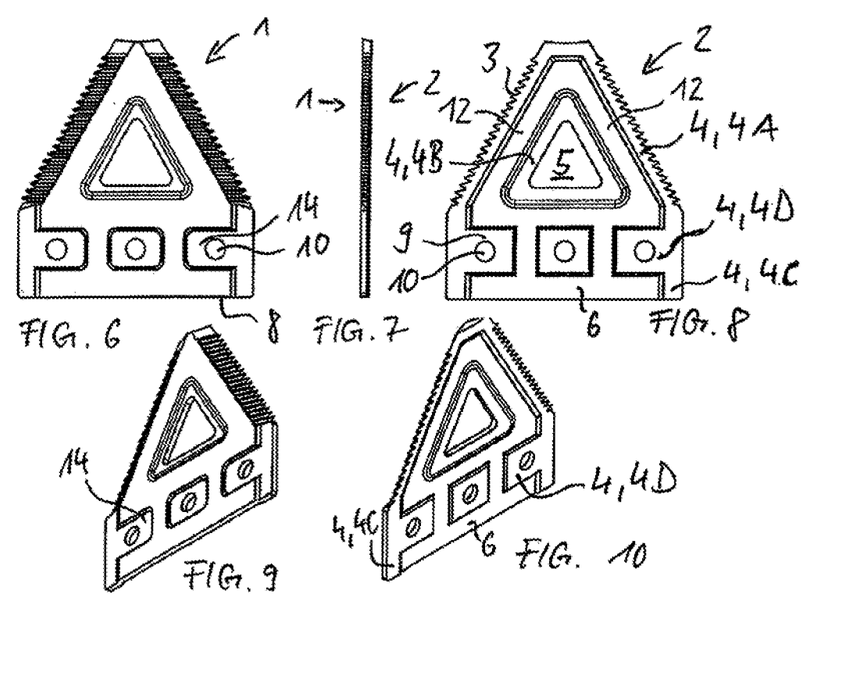
FIGS. 6 to 10 show a second embodiment of a knife blade according to the invention in different views.
Figure 11:
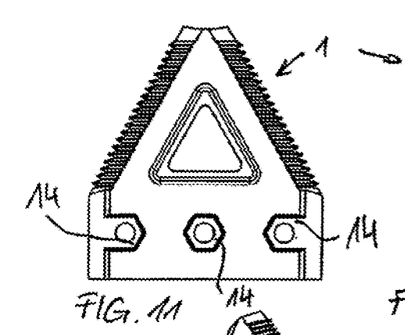
FIGS. 11 to 15 show a third embodiment of a knife blade according to the invention in different views.
Figures 12, 13, 15:
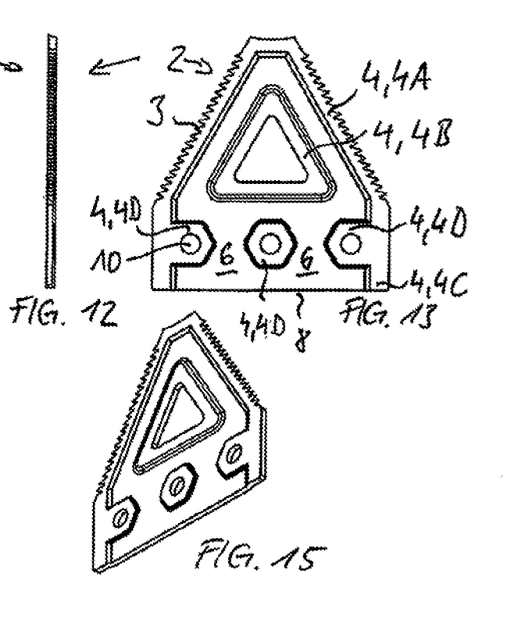
Figure 14:
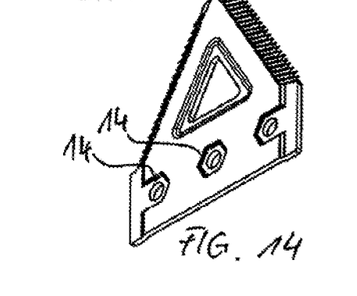

In the following, FIGS. 1 to 5 are referred to together. The embodiment of the knife blade for a cutting knife of an agricultural harvesting machine according to the invention has a surface of the blade bottom side 2, which is composed of a planar surface 4 arranged in a plane E (cf. FIG. 5) and a recessed region 6 extending above the plane, as can be seen in FIGS. 3 and 4. A height Z of the knife blade corresponds to a maximum distance between the blade top side 1 and the planar surface 4 in a direction N normal to the plane E, as shown in FIG. 5. A material thickness M of the knife blade, however, corresponds to a distance between the blade top side 1 and the blade bottom side 2, which is also measured in the normal direction N. According to the invention, the material thickness M is in at least a part of the knife blade less than the height Z of the knife blade, as illustrated by a measuring point in FIG. 5. Generally, the material thickness of the knife blade may also be greater in certain areas, namely up to the height Z of the knife blade as a maximum. Such an area can be seen in FIG. 3, near the tip of the knife 11, for example. However, it would also be conceivable that the material thickness M in any area of the knife blade is less than its height Z. Preferably, an area where the material thickness M is less than the height Z covers at least half of the surface of the blade bottom side 2.

The planar surface 4 is preferably a surface whose planarity, also known as flatness, is greater than that of the recess region 6. Any points on the planar surface 4 are thus spatially arranged in the plane E. The recess region 6 also forms a surface, but this can be uneven, i.e. curved or arched, so that points on the surface of the recess region 6 are spatially arranged in different planes. Planarity also refers to a certain surface quality which refers to a surface roughness. However, the term planar surface is not to be understood as claiming a specific surface quality. The planar surface 4 may of course be machined by at least one machining process to achieve a certain surface roughness. However, the skilled person recognizes that the planar surface 4 in the sense of the invention can be produced without machining the surface, already by a primary forming process such as casting or sintering. The skilled person recognizes that the surface of the blade top side 1 will also be flat, as the height Z of the knife blade must be adapted to a blade gap with which the knife blade interacts. The designations blade top side 1 and blade bottom side 2 are chosen arbitrarily and correspond to the mainly usual mounting position of the knife blade. The knife blade according to the invention can also be installed in a mounting position with the blade bottom side facing upwards, depending on how the cutting unit of the harvesting machine is constructed.

Plane surface 4 comprises a plurality of partial surfaces. In the cutting edge areas 3 of the knife blade, the surface of the blade bottom side 2 comprises a partial surface 4A of the planar surface 4. To differentiate between the partial surfaces 4A, the partial surfaces 4A in the edge area of the knife blade are also referred to as edge partial surfaces 4A of the planar surface 4 on the surface of the blade bottom side 2. On the surface of the blade bottom side 2, wear marks 12 are preferably arranged directly on the partial surface 4A arranged in the cutting edge areas 3 to determine wear on the cutting edge. The wear marks 12 are arranged in the recess region 6 directly at the boundary to the planar surface 4, whereby the wear marks 12 mark a height lying in the normal direction N between the planar surface 4 and the surrounding recess region 6. As soon as the wear reaches one of the wear marks 12, the knife can be replaced, for example. The wear marks 12 can be made, for example, in the form of an indentation or a chamfering. In a modified alternative embodiment, the wear mark 12 can also be formed by the recess region 6. In this case, an indentation or chamfering can be omitted.

Another partial surface 4B of the planar surface 4 of the surface of the blade bottom side 2 is arranged surrounding the opening 5, in the peripheral area 7 of the opening 5. To distinguish the partial surfaces 4B, the partial surfaces of the planar surface around the opening 5, or possibly a plurality of openings 5, of the knife blade are also designated as opening partial surfaces 4B of the planar surface 4 on the surface of the blade bottom side 2. At the rear edge 8 of the knife blade, a plurality of partial surfaces 4C of the planar surface 4 are arranged on the surface of the blade bottom side 2. To differentiate the partial surfaces 4C, the partial surfaces of the planar surface at the rear edge 8 of the knife blade are also referred to as rear partial surfaces 4C of the planar surface at the surface of the blade bottom side 2. Eventually, a partial surface 4D of the planar surface 4 is arranged in the mounting part 9. To differentiate between the partial surfaces 4D, the partial surfaces around the mounting recesses 10 of the knife blade are also referred to as mounting partial surfaces 4D of the planar surface on the surface of the blade bottom side 2. The partial surfaces 4A, 4C, 4D of the planar surface in the cutting edge areas 3, in the mounting part 9 and at the rear edge 8 of the knife blade are connected in the exemplary embodiment, while the partial surface 4B of the planar surface 4 in the peripheral area 7 of the opening 5 is separated from the other partial surfaces 4A, 4C, 4D by the recess region 6. The individual partial surfaces 4C at the rear edge 8 are also separated from each other by the recess region 6 and are only connected via the partial surface 4D of the planar surface 4 on the mounting part 9. The partial surface 4D of the planar surface 4 on the mounting part 9 is arranged around the mounting holes 10.

FIGS. 6 to 10 show a second exemplary embodiment of the knife blade according to the invention in different views, which will be described together in the following. The essential features correspond to the embodiment as shown in FIGS. 1 to 5, thus identical reference signs denote identical parts and have been partially omitted for the sake of conciseness and will not be described again in detail to avoid repetition.

The embodiment of the knife blade according to FIGS. 6 to 10 differs essentially in the configuration of the rear edge 8 and the mounting part 9 of the knife blade. As can be seen in particular in FIG. 8, only two partial surfaces 4C of the planar surface 4 are formed at the rear edge 8, which are separated by a longer section of the recess region 6. In the exemplary embodiment, the partial surface 4D of the planar surface 4 in the mounting part 9 is not contiguous, but consists of three individual partial surfaces 4D, which are each arranged around the mounting holes 10. On the blade top side 1 there are rectangular embossments 14 corresponding to the partial surface 4D of the planar surface 4 on the mounting part 9, which are also arranged accordingly around the mounting holes 10. These enhance preferably to fasten the knife blade with bolts, as a polygonal screw head in the embossment 14 is hindered from turning. The wear mark 12 in the present embodiment is located within the recess region 6 or formed by it.

FIGS. 11 to 15 show a third exemplary embodiment of the knife blade according to the invention in different views, which will be described together in the following. The essential features correspond to the embodiment as shown in FIGS. 1 to 5, thus identical reference signs denote identical parts and have been partially omitted for the sake of conciseness and will not be described again in detail to avoid repetition. The embodiment of the knife blade according to FIGS. 11 to 15 corresponds to the second exemplary embodiment in the design of the rear edge 8, so that this will not be discussed further.

The three partial surfaces 4D of the planar surface 4 on the mounting part 9, which are also separated here, are arranged around the mounting holes 10 as described before. On the blade top side 1 there are the embossments 14 corresponding to the partial surfaces 4D of the planar surface 4 on the mounting part 9, as well arranged around the mounting holes 10. In the exemplary embodiment, the embossments 14 are hexagonal in shape, corresponding to a common polygonal screw head. If the knife blade is fixed with a hexagonal screw head with a bolt, the bolt cannot rotate in the embossment 14.

FIGS. 16 to 20 show a fourth exemplary embodiment of the knife blade according to the invention in different views. The essential features correspond to the embodiment as shown in FIGS. 1 to 5, thus identical reference signs denote identical parts and have been partially omitted for the sake of conciseness and will not be described again in detail to avoid repetition. The embodiment of the knife blade according to FIGS. 16 to 20 is similar to the first exemplary embodiment, but has further features which relate to the blade top side 1.

Figures 16, 17, 18, 19:
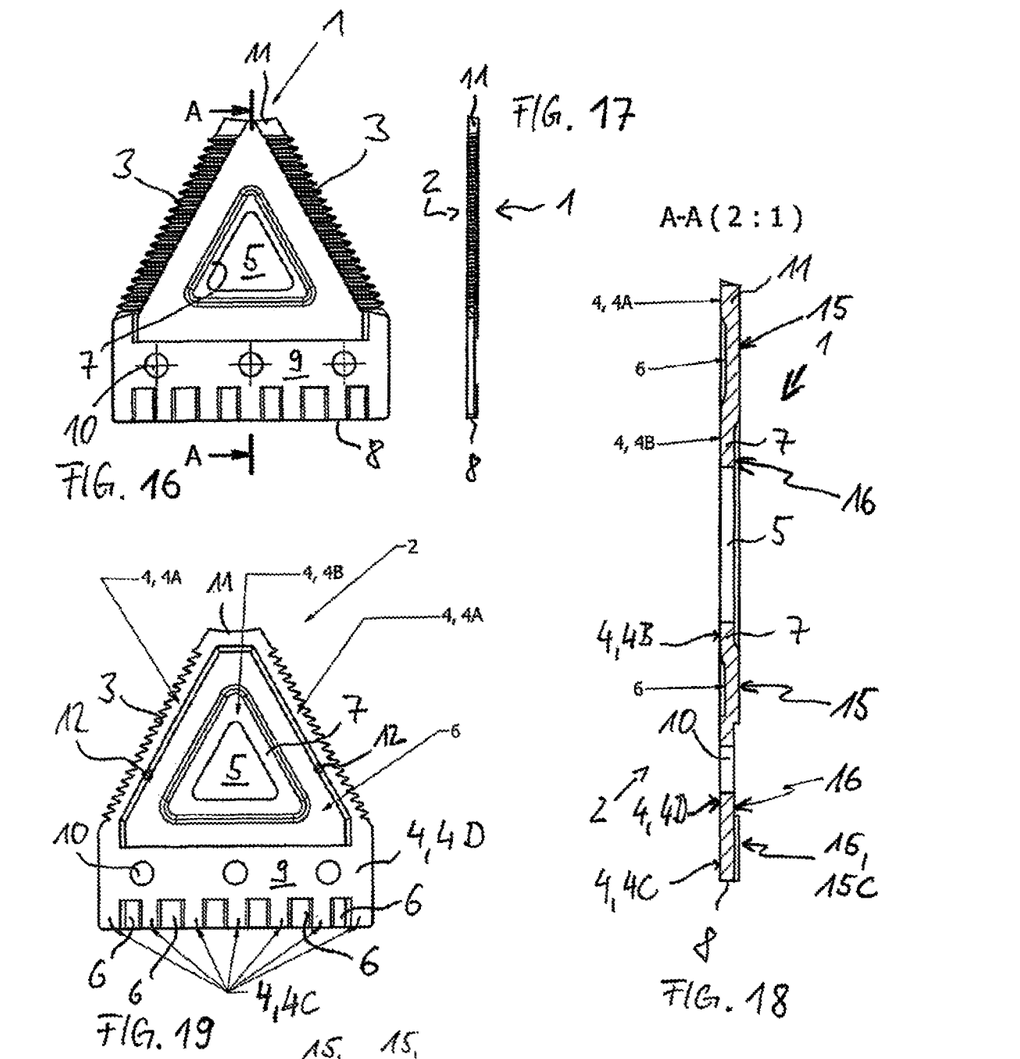
FIGS. 16 to 20 show a fourth embodiment of a knife blade according to the invention in different views.

FIG. 16 shows the knife blade according to the fourth embodiment of the invention in a plan view of the blade top side 1. FIG. 17 shows the knife blade of FIG. 16 in a 90 degree rotated view from the side, in which the position of the knife tip 11 at the front and the rear edge 8 at the back, as well as the overall flat shape of the knife blade with the blade top side 1 and the blade bottom side 2 are visible. In FIG. 18, a section view along the line A-A in FIG. 16 is depicted in double magnification. FIG. 19 shows a view of the blade bottom side 2 of the knife blade, whereas FIG. 20 shows an enlarged view of the rear edge 8 rotated by 90 degrees compared to FIG. 16.

Figure 20:
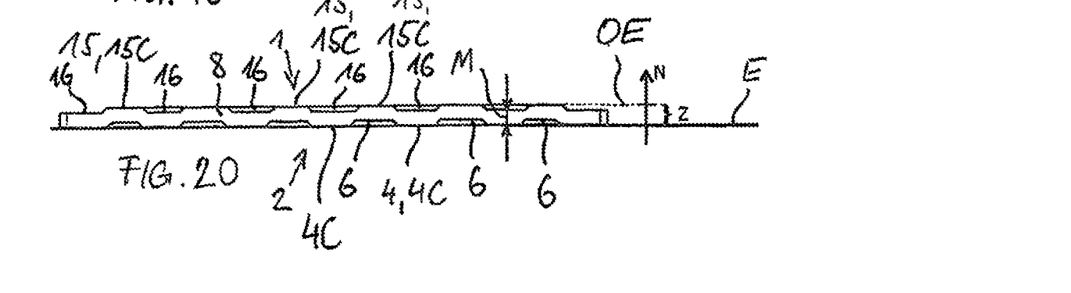

In the following, FIGS. 16 to 20 are referred to together. The embodiment of the knife blade for a cutting knife of an agricultural harvesting machine according to the invention has a surface of the blade bottom side 2, which is composed of a planar surface 4 arranged in a plane E (cf. FIG. 20) and a recessed region 6 extending above the plane, as can be seen in FIGS. 18 and 19. The height Z of the knife blade corresponds to the maximum distance between the blade top side 1 and the planar surface 4 in a normal direction N to the plane E, as shown in FIG. 20. A surface of the blade top side 1 is, however, composed of an upper planar surface 15 arranged in an upper plane OE (FIG. 20) and a top side region 16 extending outside the upper plane.

The material thickness M of the knife blade corresponds to the distance between the blade top side 1 and the blade bottom side 2, which is measured in normal direction N. According to the invention, the material thickness M is in at least a part of the knife blade less than the height Z of the knife blade, as illustrated by a measuring point in FIG. 5. The lower plane E and the upper plane OE are preferably aligned parallel to each other and spaced apart by the height Z of the knife blade.

At the rear edge 8 of the knife blade on the surface of the blade top side 1 there are preferably a plurality of upper partial surfaces 15C of the upper planar surface 15, whereby the upper partial surfaces 15C are each arranged opposite the recess region 6 at the rear edge 8 on the blade bottom side 2. The upper partial surfaces 15C are arranged intermittently with the top side region 16 along the rear edge 8, with the partial surfaces 4C on the blade bottom side 2 each being arranged opposite the top side region 16, so that the upper partial surfaces 15C along the rear edge 8 are arranged alternately with the partial surfaces 4C on the blade bottom side 2. Thus the knife blade according to the invention can be mounted with the blade bottom side 2 downwards as well as with the blade top side 1 downwards. In addition, the reduced surface area of the rear edge 8, resulting from the waveform visible in FIG. 20, advantageously reduces friction when bearing against guiding elements supporting the knife blade to the rear (not shown).

LIST OF REFERENCE SIGNS

1 Blade top side
2 Blade bottom side
3 Cutting edge area
4 Planar surface
4A Partial surfaces of the planar surface in a cutting edge area, edge partial surfaces
4B Partial surfaces of the planar surface in a peripheral area of the opening, opening partial surfaces
4C Partial surfaces of the planar surface at a rear edge of the knife blade, rear partial surfaces
4D Partial surfaces of the planar surface on a mounting part, mounting partial surfaces
5 Openings
6 Recess region
7 Peripheral area of the opening
8 Rear edge of the knife blade
9 Mounting part
10 Mounting recess, bore
11 Knife tip
12 Wear marks
14 Embossment
15 Upper planar surface
15C Upper partial surfaces of the upper planar surface at the rear edge
16 Top side region
OE Upper plane
E Plane
N Normal direction
Z Height of the knife blade

The invention claimed is:
1. A knife blade for a cutting knife of an agricultural harvesting machine, with a blade top side and a blade bottom side,
   wherein a surface of the blade bottom side is composed of a planar surface arranged in a plane and a recess region extending above the plane,
   wherein a height of the knife blade corresponds to a maximum distance between the blade top side and the planar surface in a direction normal to the plane
   wherein a material thickness of the knife blade corresponds to a distance between the blade top side and the blade bottom side,
   wherein the material thickness is in at least a part of the knife blade less than the height of the knife blade, and
   wherein the knife blade has a central opening, wherein the central opening is located in the knife blade and wherein a partial surface of the planar surface of the surface of the blade bottom side is arranged around the central opening.

2. The knife blade according to claim 1, wherein a plurality of partial surfaces of the planar surface are arranged at a rear edge of the knife blade on the surface of the blade bottom side.

3. The knife blade according to claim 2, wherein the partial surfaces at the partial surfaces at the rear edge are separated from each other by the recess region.

4. The knife blade according to claim 1, wherein a surface of the blade top side is composed of an upper planar surface arranged in an upper plane and a top side region extending outside the upper plane.

5. The knife blade according to claim 4, wherein a plurality of upper partial surfaces of the upper planar surface are arranged at a rear edge of the knife blade on the surface of the blade top side.

6. The knife blade according to claim 5, wherein the upper partial surfaces on the blade top side are arranged opposite to the recess region on the blade bottom side.

7. The knife blade according to claim 6, wherein the upper partial surfaces are arranged along the rear edge alternately with the partial surfaces on the blade bottom side.

8. The knife blade according to claim 1, wherein an area where the material thickness is less than the height covers at least half of the surface area of the blade bottom side.

9. The knife blade according to claim 1, wherein the material thickness is less than the height in any area of the knife blade.

10. The knife blade according to claim 1, wherein a cutting edge is formed on at least one edge region of the knife blade, wherein the surface of the blade bottom side comprises a partial surface of the planar surface at least in the edge region.

11. The knife blade according to claim 10, wherein at least one wear mark for determining wear at the cutting edge is arranged on the surface of the blade bottom side outside the partial surface, wherein the wear mark marks a height in the normal direction between the planar surface and the recess region.

12. The knife blade according to claim 1, wherein at least one mounting recess is provided, wherein a partial surface of the planar surface is arranged around the mounting recess on the surface of the blade bottom side.

13. The knife blade according to claim 12, wherein the blade top side has an embossment surrounding the mounting recess, said embossment being shaped to correspond to a fastening means.

14. A method of manufacturing the knife blade according to claim 1, wherein at least one shaping step is provided in which the knife blade is shaped in such a way that the material thickness is in at least a part of the knife blade less than the height of the knife blade.

15. A knife blade for a cutting knife of an agricultural harvesting machine, with a blade top side and a blade bottom side,
wherein a surface of the blade bottom side is composed of a planar surface arranged in a plane and a recess region extending above the plane,
wherein a height of the knife blade corresponds to a maximum distance between the blade top side and the planar surface in a direction normal to the plane,
wherein a material thickness of the knife blade corresponds to a distance between the blade top side and the blade bottom side,
and wherein the material thickness is in at least a part of the knife blade less than the height of the knife blade,
wherein a plurality of partial surfaces of the planar surface on the surface of the blade bottom side are arranged at the rear edge of the knife blade, and
wherein the partial surfaces at the rear edge are separated from each other by the recess region.

16. The knife blade according to claim 15, wherein the knife blade has at least one opening, wherein a partial surface of the planar surface of the surface of the blade bottom side is arranged around the opening.

17. The knife blade according to claim 16, wherein the knife blade has a central opening, wherein the partial surface of the planar surface of the surface of the blade bottom side is arranged around the opening.

18. The knife blade according to claim 15, wherein a surface of the blade top side is composed of an upper planar surface arranged in an upper plane and a top side region extending outside the upper plane.

19. The knife blade according to claim 18, wherein a plurality of upper partial surfaces of the upper planar surface are arranged at a rear edge of the knife blade on the surface of the blade top side.

20. The knife blade according to claim 19, wherein the upper partial surfaces on the blade top side are arranged opposite to the recess region on the blade bottom side.

21. The knife blade according to claim 20, wherein the upper partial surfaces are arranged along the rear edge alternately with the partial surfaces on the blade bottom side.

22. The knife blade according to claim 15, wherein a cutting edge is formed on at least one edge region of the knife blade, wherein the surface of the blade bottom side comprises a partial surface of the planar surface at least in the edge region.

23. The knife blade according to claim 22, wherein at least one wear mark for determining wear at the cutting edge is arranged on the surface of the blade bottom side outside the partial surface, wherein the wear mark marks a height in the normal direction between the planar surface and the recess region.

24. The knife blade according to claim 15, wherein at least one mounting recess is provided, wherein a partial surface of the planar surface is arranged around the mounting recess on the surface of the blade bottom side.

25. The knife blade according to claim 24, wherein the blade top side has an embossment surrounding the mounting recess, said embossment being shaped to correspond to a fastening means.

26. A method of manufacturing the knife blade according to claim 15, wherein at least one shaping step is provided in which the knife blade is shaped in such a way that the material thickness is in at least a part of the knife blade less than the height of the knife blade.

27. A knife blade for a cutting knife of an agricultural harvesting machine, with a blade top side and a blade bottom side,
wherein in a surface of the blade bottom side is composed of a planar surface arranged in a plane and a recess region extending above the plane,
wherein a height of the knife blade corresponds to a maximum distance between the blade top side and the planar surface in a direction normal to the plane
wherein a material thickness of the knife blade corresponds to a distance between the blade top side and the blade bottom side,
wherein the material thickness is in at least a part of the knife blade less than the height of the knife blade, and
wherein the knife blade has a front part with cutting edges and a mounting part with mounting means for fastening the knife blade,
wherein the knife blade has at least one opening located in the front part of the knife blade, and
wherein a partial surface of the planar surface of the surface of the surface of the blade bottom side is arranged around the at least one opening.

28. The knife blade according to claim 27, wherein the at least one opening is located between the cutting edges.

29. The knife blade according to claim 27, wherein the knife blade has two or more openings, wherein the partial surface of the planar surface of the surface of the blade bottom side is arranged around the openings.

* * * * *